3,029,236
NEW RUBICENE DYESTUFFS CAPABLE OF FIXATION ON TEXTILE FIBERS

Max Staeuble, Basel, and Kurt Weber, Bottmingen, Switzerland, assignors to Ciba Company, Inc., Fairlawn, N.J.
No Drawing. Filed Aug. 25, 1958, Ser. No. 757,137
Claims priority, application Switzerland Sept. 4, 1957
10 Claims. (Cl. 260—249.5)

This invention provides new organic dyestuffs containing a polycyclic aromatic hydrocarbon radical as at least one chromophore and together with at least one acid, water-solubilizing group, a radical including at least one replaceable halogen atom.

As examples of dyestuffs of the specified type may be mentioned dyestuffs containing radicals derived from the following fundamental compounds:

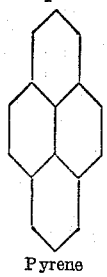

Pyrene

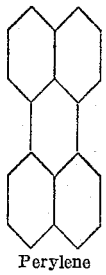

Perylene

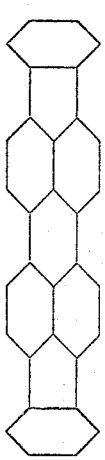

Periflanthene

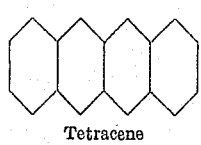

Tetracene

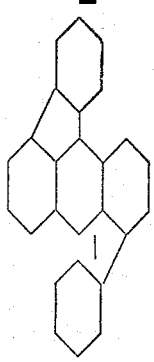

Rubicene

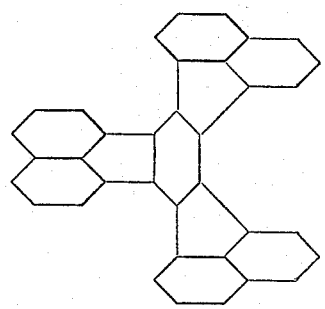

Decacyclene

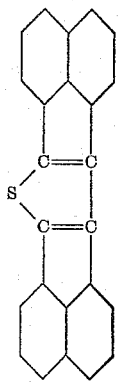

Dinaphthylene-thiophene

As in the case of dinaphthylene thiophene, the polycyclic hydrocarbon radicals can contain hetero rings condensed therein.

As radicals containing at least one replaceable halogen atom may be mentioned, for example, the β-chloropropionylamino- or the di-chloro-propionylamino radical but more especially the radical of the formula (1)

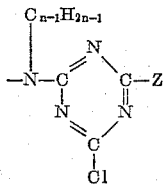

in which $n$ indicates a whole number which is at most 4 and Z is a chlorine atom, an amino group which may be substituted or a substituted hydroxyl or mercapto group.

The specified groups containing replaceable halogen atoms, especially the grouping of the Formula 1 can be attached to the hydrocarbon radical either directly or by way of a methylene bridge or preferably by way of a grouping of the formula (2)         —HN—R— in which R indicates a bivalent organic radical, preferably an alkylene or arylene radical. A further linking grouping is the group of the formula (3)         —SO$_2$D—R— in which R has the meaning given above and D is an oxygen atom or an imino group.

The new dyestuffs are obtained when polycyclic aromatic hydrocarbons containing at least one acylatable amino group are reacted with compounds containing at least two replaceable halogen atoms and, if desired, replaceable halogen atoms in resulting compounds replaced by other substituents, the starting materials being so selected that at least one component contains an acid, water-solubilizing group and the reaction conditions being such that the final product still contains at least one replaceable halogen atom.

As compounds containing at least two replaceable halogen atoms there may primarily be mentioned 6-membered hetero rings with at least two nitrogen atoms, for example dichloro 1:3-diazines, but more especially trichloro-1:3:5-triazine, usually known as cyanuric chloride. Among compounds containing aliphatically bound replaceable halogen atoms there may be mentioned β-chloropropionyl chloride and dichloropropionyl chloride. Instead of cyanuric chloride there can also be used a primary condensation product thereof containing two chlorine atoms and instead of the third chlorine atom an NH$_2$— group or an organic radical, for example the radical of an amine, a hydroxyl or a mercapto compound. Such dichlorotriazines can be prepared from cyanuric chloride by methods known per se, for example by reacting 1 mol of cyanuric chloride with 1 mol of an amino-, hydroxyl- or mercapto-compound with or without dyestuff character. As such compounds with dyestuff character are concerned in this case, for example, aminothioxanthones or amino azodyestuffs, such as those obtainable by coupling diazo compounds (for example diazotized amino-benzene or aminonaphthalene sulfonic acids) with azo components containing amino groups (such as cresidine, m-toluidine, m-acylamino-anilines and so on) or such as can be produced by coupling barbituric acids or pyrazolones, especially 1-phenyl-3-methyl-5-pyrazolone-2'-, -3'-, -4'-sulfonic acid, with diazotized monoacyl derivatives of aromatic diamines (such as acetylamino-aniline sulfonic acids) and hydrolysis of the resulting acylamino dyestuffs. As compounds having no dyestuff character are concerned, for example, ammonia, aliphatic or aromatic hydroxyl compounds, such as methyl, ethyl or butyl alcohol, phenol, o-, m- or p-cresol, 4-secondary butyl phenol, 4-tertiary amyl phenol, dialkylphenols, p-chlorophenol, aliphatic or aromatic mercaptans, such as methyl, ethyl or benzyl mercaptan or their alkali metal salts, β-hydroxyethyl mercaptan, thiophenol (phenyl mercaptan), thiophenol sulfonic acids, mercaptobenzoic acids, thioglycollic acid, mercaptosuccinic acid (d,l-thiomalic acid) and the like, but primarily organic nitrogen compounds, such as methyl-, dimethyl-, ethyl-, diethyl-, isopropyl-, butyl-, hexyl-, phenyl-, tolyl-, 4-chlorophenyl-, N-methylphenyl- or cyclohexyl-amine or also β-chlorethylamine, methoxyethylamine, γ-methoxypropylamine, mono-, and di-ethanolamine, acetamide, butyric acid amide, urea, thiourea, toluene sulfonic acid amide, glycocoll, aminocarbonic acid esters, such as the methyl or ethyl ester, ethyl amino acetate, amino acetamide, amino-ethane sulfonic acids, 1-aminobenzene-2- or -4-methylsulfone, 1-aminobenzene-2:5-disulfonic acid, aminobenzoic acids and their sulfonic acids, 1-aminobenzene-2-, -3- or -4-sulfonic acid or their sulfonamides or sulfones, phenylhydrazine and the sulfonic acids thereof. The resulting primary condensation products still contain two reactive halogen atoms. Those containing no sulfonic acid groups, in the present process are condensed only with dyestuffs containing at least one sulfonic acid group, whereas the primary condensation products containing one or two sulfonic acid groups are likewise suitable for reaction with dye-compounds free from sulfonic acid groups. For the production of dyestuffs containing a single replaceable chlorine atom it is also possible to start from a dyestuff containing two such chlorine atoms and in such dichlorotriazine dyestuffs to replace one of the two chlorine atoms by reaction with ammonia or with an aliphatic or aromatic amino-, hydroxyl- or mercapto-compound.

As suitable starting materials for the present process have proved hydrocarbons of the type above specified containing at least one acylatable amino group and at least one sulfonic acid group. The acylatable amino group can be attached to one of the aromatic nuclei of the hydrocarbon either directly or by way of a bridge member, for example an alkylene group, a sulfonic acid ester group, a sulfone group or more especially a sulfonamide group. Such compounds serving as starting materials for the present process can be obtained, for example, by nitration of the corresponding fundamental compound, reduction of the nitro compounds to the amino compounds and sulfonation, or by reacting the sulfochlorides (obtained, for example, by treatment of the fundamental compounds with chlorsulfonic acid or by reaction of the polysulfonic acid of the fundamental compound with acid chlorinating agents) with organic compounds containing an acylatable hydroxyl or amino group and either a further acylatable amino group or a radical which after reaction with the sulfonic acid chloride can be converted into an acylatable amino group.

Another possible method of preparing starting materials suitable for the present process consists in that the fundamental compound is chloromethylated and sulfonated and in the chloromethyl groups introduced the chlorine atom replaced by a hydroxyl or amino group.

The dyestuffs obtained by the process described are new. They are valuable water-soluble dyestuffs which are suitable for the dyeing and printing of a wide variety of materials, especially polyhydroxylated materials of fibrous structure and also synthetic fibers, for example from regenerated cellulose or viscose, or natural materials, for example linen or more especially cotton. The new dyestuffs of this invention correspond in their free acid form to the formula

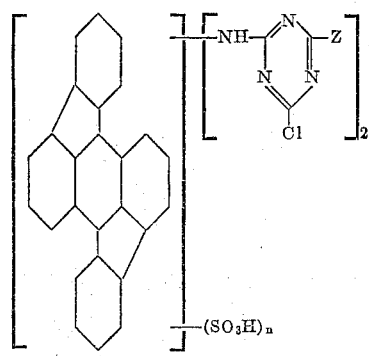

in which $n$ represents a whole number from 2–4 and Z represents a member selected from the group consisting of a chlorine atom, an amino group which may be substituted and an etherified hydroxy group, and thus comprise the dyestuffs of the following formulae

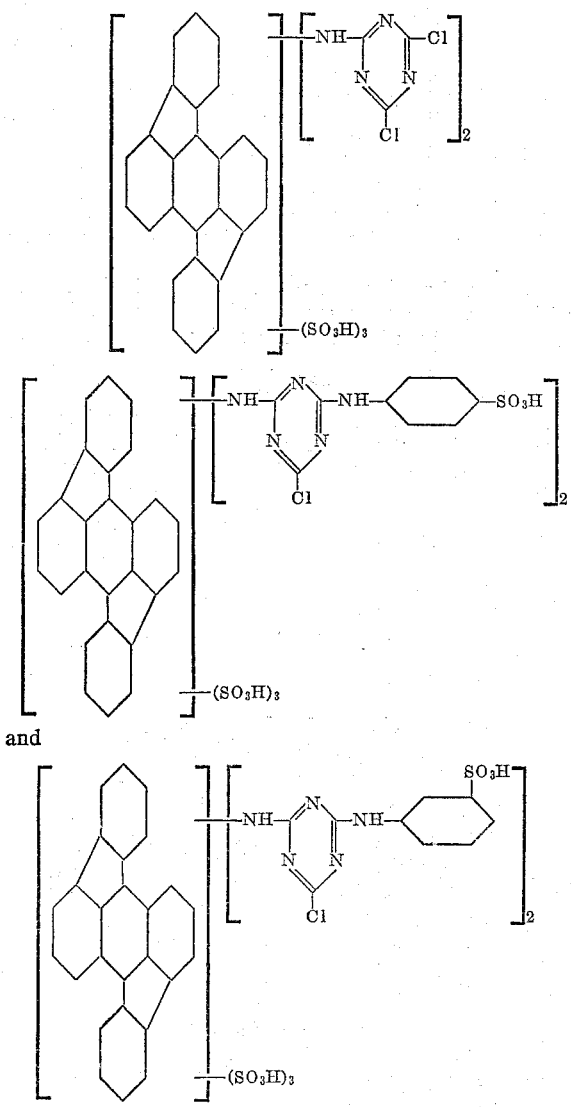

and

The dyestuffs of the invention, applied to the fiber by foularding, printing or direct dyeing, can for the purpose of fixation be subjected to an alkali treatment, for example with sodium carbonate, sodium hydroxide, an alkaline earth hydroxide, trisodium phosphate and so on, and to a heat treatment. The dyeing can be carried out, for example, at elevated to moderately elevated temperature, i.e. at 50–100° C., or in the case of dichlorotriazine dyestuffs by a so-called cold process, for example at about 20–50° C. In order to exhaust the bath it is to be recommended to add to the dye bath, preferably in portions, at the same time as the dyestuffs or during the dyeing process, more or less neutral, primarily inorganic salts, such as alkali chlorides or sulfates. During the dyeing process the dyestuffs react with the polyhydroxylated material to be dyed, being fixed probably by chemical combination. The addition of acid-binding agents to the dye bath can take place at the commencement of the dyeing operation; advantageously the alkaline agents are so added that the pH value of the dye bath, which originally reacts weakly acid to neutral or weakly alkaline, gradually rises throughout the dyeing operation.

Instead of preparing the dye baths by taking up the specified dyestuffs and if desired more or less neutral inorganic salts simultaneously or separately and consecutively in water, the dyestuffs and the salts can also be worked up to paste-like or preferably to dry preparations.

Since some of the dyestuffs concerned, on account of their content of labile substituents, have a certain sensitivity to acids and strong alkalies, it is advantageous not to admix with the dye preparations described, any salts of strong alkaline reaction in water. On the other hand it has proved to be advantageous to prepare the dyestuffs in the presence of weakly alkaline reacting salts, such as mixtures of mono- and di-sodium phosphates and to dry the preparations produced.

By means of the dyestuffs of the present invention containing at least one sulfonic acid group there are obtained on polyhydroxylated, especially cellulosic, textile materials, very valuable, strong and in most cases very full dyeings and prints of outstanding fastness to wet processing and good fastness to light.

In some cases it may be advantageous to subject the dyeings obtainable by the present process to an after-treatment.

Thus the dyeings obtained are advantageously soaped; by this after-treatment any dyestuff that is not completely fixed is removed.

The following examples illustrate the invention, the parts and percentages being by weight unless otherwise stated and the relation between part by weight and part by volume being the same as that between the gram and the cubic centimeter:

Example 1

1.9 parts of cyanuric chloride are dissolved in 8 parts of acetone and the solution poured in a fine stream, with good stirring, into 25 parts of ice cooled water. To the cyanuric chloride suspension produced is added a neutral solution, cooled to 2° C., of 3.0 parts of diamino-rubicene sulfonic acid, in the form of the sodium salt, dissolved in 150 parts of water. The mineral acid split off in the condensation is neutralized at 0 to 4° C. by the gradual dropwise introduction of a total quantity of 5.5 parts by volume of 2 N-sodium carbonate solution in such a manner that the pH value of the condensation solution is continuously maintained between 5.0 and 7.0. When the condensation is complete, the dyestuff is precipitated with 10% sodium chloride, filtered and washed with a little 10% sodium chloride solution containing 23 parts of di-sodium phosphate and 14.5 parts of monopotassium phosphate per liter. After strong suction drying, the dyestuff is completely dried under vacuum at 30–35° C.

Cotton and regenerated cellulose are dyed by the method given in Example 3 in reddish dark blue shades of good fastness to washing.

The diamino-rubicene sulfonic acid used as starting material can be obtained according to the German Patent No. 655,649 by nitration of rubicene, reduction of the dinitro-rubicene to the diamino rubicene and sulfonation of the latter.

Example 2

3 parts of diamino-rubicene sulfonic acid are dissolved to give a neutral solution, with the addition of dilute sodium hydroxide solution, in 100 parts of water. A solution at 40° C. of 3.45 parts of 2:4-dichloro-6-phenyl-amino-1:3:5-triazine-4'-sulfonic acid, in the form of the sodium salt, in 150 parts of water is then added thereto with stirring and the whole heated to 65–70° C. The mineral acid split off in the condensation is neutralized using a pH meter by gradual addition of 5.5 parts by volume of 2 N-sodium carbonate solution in such a manner that the pH value of the solution is continuously maintained between 6.0 and 7.0. When the condensation is complete, the dyestuff is salted out by a 10% addition of sodium chloride, filtered and dried under vacuum at 60–70° C.

Cotton and regenerated cellulose are dyed by the method given in Example 4 below in blue-grey shades of good fastness to washing.

Example 3

2 parts of the dichloro triazine dyestuff obtained according to Example 1 are dissolved in 400 parts of water with 80 parts of trisodium phosphate and the solution diluted to 4000 parts. After the addition of 80 parts of sodium chloride, 100 parts of a cotton fabric are entered into this dye bath, the temperature raised within half an hour to 60° C., a further 80 parts of sodium chloride added, the temperature raised within a ¼ of an hour to 80° C. and this temperature maintained for half an hour. The resulting reddish dark blue dyeing is rinsed and soaped for 15 minutes in a boiling 0.3% solution of a non-ionic washing agent. It exhibits excellent fastness properties.

Example 4

1 part of the dyestuff obtained according to Example 2 is dissolved in 100 parts of water. With this solution a cotton fabric is impregnated at 80° C. on the foulard and the excess liquid is squeezed off so that the material retains 75% of its weight of dyestuff solution. The goods so impregnated are dried and then further impregnated at room temperature in a solution containing per liter 10 grams of sodium hydroxide and 300 grams of sodium chloride, squeezed off to a liquid take-up of 75% and steamed for 60 seconds at 100–101° C. The goods are then rinsed, treated in 0.5% sodium bicarbonate solution, rinsed again, soaped at boiling temperature for ¼ of an hour in an 0.3% solution of a non-ionic washing agent, further rinsed and dried. A reddish dark blue dyeing results which is fixed fast to boiling.

Example 5

3 parts of diamino-rubicene sulfonic acid are dissolved to a neutral solution in 100 parts of water with the addition of dilute sodium hydroxide solution. With stirring, there is added a 40° C. solution of 3.45 parts of 2:4 - dichloro - 6-phenylamino-1:3:5-triazine-3'-sulfonic acid, in the form of the sodium salt, dissolved in 100 parts of water and the whole is heated to 60–70° C. The mineral acid split off in the condensation is neutralized by the gradual addition of 10 parts of N-sodium hydroxide solution, in such a manner that the pH value of the solution remains continuously between 5.0 and 7.0. When the condensation is complete, the dyestuff is salted out by addition of sodium chloride, filtered and dried under vacuum at 70° C.

Cotton and regenerated cellulose are dyed by the methods given in Examples 3 and 4 in blue-grey shades of good fastness to washing.

When in this example, in the dyestuff synthesis, instead of 2:4 - dichloro-6-phenylamino-1:3:5-triazine-3'-sulfonic acid, 2:4 - dichloro-6-phenylamino-1:3:5-triazine-2'-sulfonic acid is used or the equivalent quantity of the mono-condensation product of 1-aminobenzene-2:5-disulfonic acid and cyanuric chloride or of 2-aminonaphthalene-4:8-disulfonic acid and cyanuric chloride, dyestuffs with similar properties are obtained.

Example 6

1.9 parts of cyanuric chloride and 3.0 parts of diamino-rubicene sulfonic acid are condensed as described in Example 1. When the condensation is complete, 15 parts by volume of a 2 N-ammonium hydroxide solution are slowly allowed to flow in at a pH value of 7.0–9.0 followed by heating to 35° C. Stirring is continued for a further hour at 35° C. and the dyestuff is salted out from its solution by the addition of sodium chloride. It is isolated by filtration and dried under vacuum at 60–70° C.

Cotton and regenerated cellulose are dyed by the method given in Example 3 in reddish dark blue shades of good fastness to washing.

Example 7

3.5 parts of diamino-rubicene sulfonic acid are dissolved to a neutral solution in 100 parts of water with the addition of dilute sodium hydroxide solution and treated with good stirring at 0–2° C. with a solution of 2.5 parts of β-chloropropionyl chloride in 4 parts of toluene. The mineral acid split off in the acylation is continuously neutralized at 0–4° C. with N-sodium hydroxide solution so that the pH value of the solution remains between 5.0 and 7.0. When the reaction is complete and no more acid is split off, the pH value of the solution is adjusted to 8.5 by further addition of sodium hydroxide solution. The dyestuff is then salted out from its solution with sodium chloride, filtered off and dried at 70–80° C. under vacuum.

Cotton and regenerated cellulose are dyed with the resulting dyestuff by the method of Example 8 below in grey shades of good fastness to washing.

Example 8

2 parts of the dyestuff obtained according to Example 7 are mixed with 25 parts of urea and dissolved in 75 parts of water. After the addition of 2 parts of sodium carbonate, a cotton fabric is impregnated with the resulting solution, squeezed off to a 75% increase in weight and dried. After a heat treatment of five minutes at 150° C., the dyeing is rinsed and soaped. A grey dyeing, fixed fast to boiling, is produced.

What is claimed is:

1. Diamino-rubicene sulfonic acids of the formula

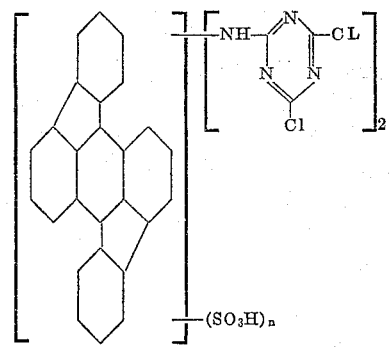

in which $n$ represents a whole number in the range from 2 to 4 inclusive, the position of the triazinylamino groups being the same as that of the nitro groups in dinitro-rubicene.

2. Diamino-rubicene sulfonic acids of the formula

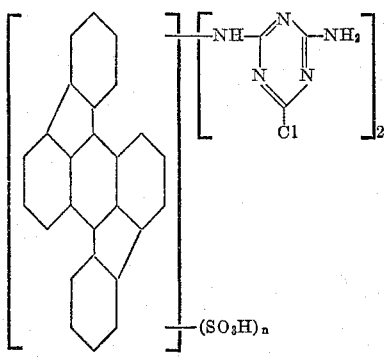

in which $n$ represents a whole number in the range from 2 to 4 inclusive, the position of the triazinylamino groups being the same as that of the nitro groups in dinitro-rubicene.

3. Diamino-rubicene sulfonic acids of the formula

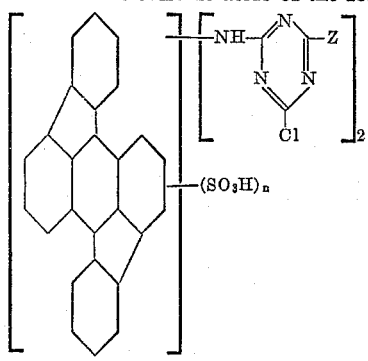

in which $n$ represents a whole number in the range from 2 to 4 inclusive, and Z stands for sulfophenylamino, the position of the triazinylamino groups being the same as that of the nitro groups in dinitrorubicene.

4. Diamono-rubicene sulfonic acids of the formula

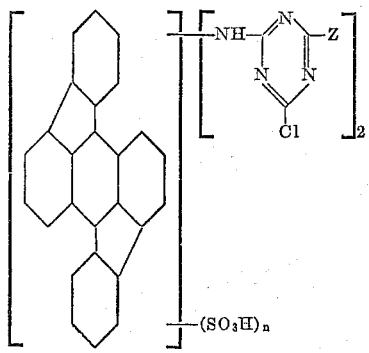

in which $n$ represents a whole number in the range from 2 to 4 inclusive and Z stands for disulfonaphthylamino, the position of the triazinylamino groups being the same as that of the nitro groups in dinitrorubicene.

5. Diamino-rubicene sulfonic acids of the formula

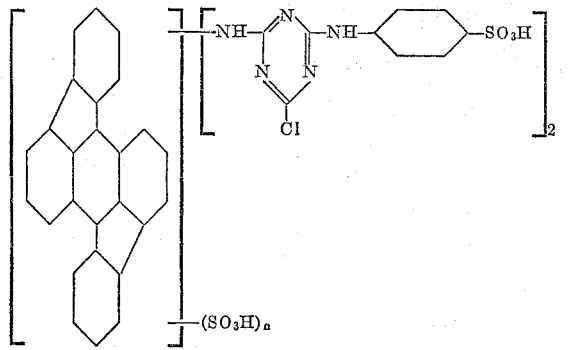

in which $n$ represents a whole number in the range from 2 to 4 inclusive, the position of the triazinylamino groups being the same as that of the nitro groups in dinitrorubicene.

6. Diamino-rubicene sulfonic acids of the formula

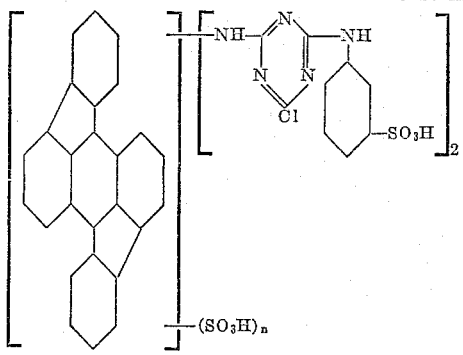

in which $n$ represents a whole number in the range from 2 to 4 inclusive, the position of the triazinylamino groups being the same as that of the nitro groups in dinitrorubicene.

7. Diamino-rubicene sulfonic acids of the formula

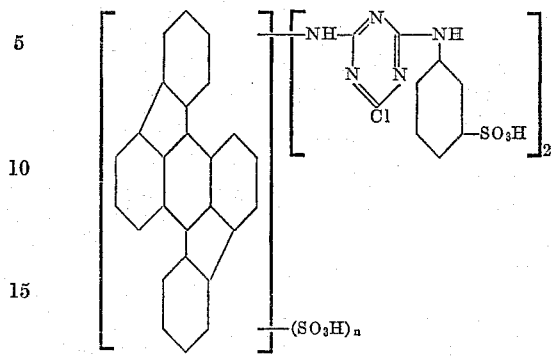

in which $n$ represents a whole number in the range from 2 to 4 inclusive, the position of the triazinylamino groups being the same as that of the nitro groups in dinitrorubicene.

8. Diamino-rubicene sulfonic acids of the formula

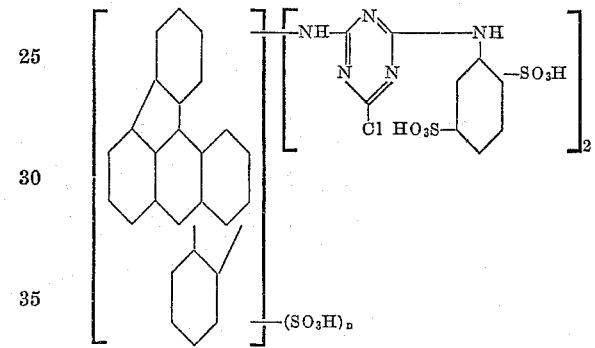

in which $n$ represents a whole number in the range from 2 to 4 inclusive, the position of the triazinylamino groups being the same as that of the nitro groups in dinitrorubicene.

9. Diamino-rubicene sulfonic acids of the formula

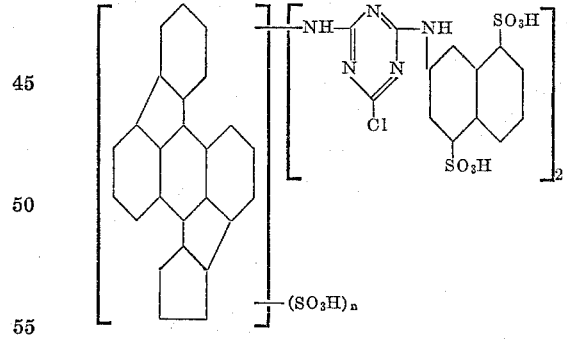

in which $n$ represents a whole number in the range from 2 to 4 inclusive, the position of the triazinylamino groups being the same as that of the nitro groups in dinitrorubicene.

10. Alkali metal salt of diamino-rubicene sulfonic acid of the formula

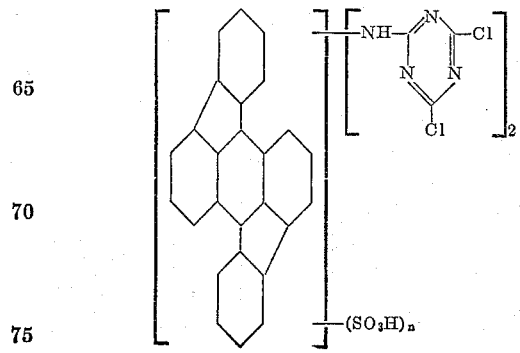

in which n represents a whole number in the range from 2 to 4 inclusive, the position of the triazinylamino groups being the same as that of the nitro groups in dinitrorubicene.

References Cited in the file of this patent

UNITED STATES PATENTS

| | | |
|---|---|---|
| 1,886,480 | Haller et al. | Nov. 8, 1932 |
| 2,720,480 | Wolf | Oct. 11, 1955 |
| 2,728,767 | Wolf | Dec. 27, 1955 |
| 2,940,812 | Denyer et al. | June 14, 1960 |

FOREIGN PATENTS

| | | |
|---|---|---|
| 655,649 | Germany | Dec. 30, 1937 |

OTHER REFERENCES

Richter's Organic Chemistry, vol. III, "Aromatic Compounds," pages 690–91 Elsevier Pub. Corp., 1946 (3rd Eng. Ed.).

Conant: "The Chemistry of Organic Compounds," pages 558 to 560, The Macmillan Co., New York (1947).

Vickerstaff: Melliand Textilberichte, vol. 39, pages 905–908, August 1958.

UNITED STATES PATENT OFFICE
CERTIFICATE OF CORRECTION

Patent No. 3,029,236                          April 10, 1962

Max Staeuble et al.

It is hereby certified that error appears in the above numbered patent requiring correction and that the said Letters Patent should read as corrected below.

Column 2, the first formula should appear as shown below instead of as in the patent:

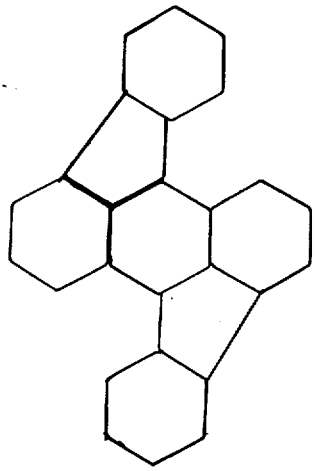

column 8, lines 32 to 45, upper right-hand portion of the formula, for "-CL" read -- -Cl --; column 9, line 20, for "Diamono-rubicene" read -- Diamino-rubicene --; column 10, lines 4 to 17, the upper right-hand portion of the formula should appear as shown below instead of as in the patent:

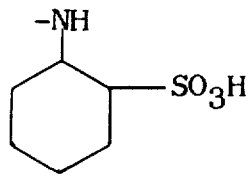

same column 10, lines 23 to 37, the left-hand portion of the formula should appear as shown below instead of as in the patent:

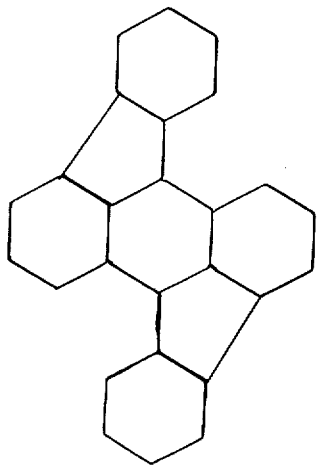

same column 10, lines 43 to 55, the left-hand portion of the formula should appear as shown below instead of as in the patent;

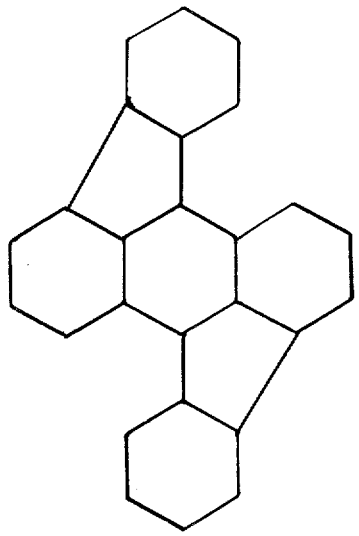

Signed and sealed this 27th day of November 1962.

(SEAL)
Attest:
ERNEST W. SWIDER
ESTON G. JOHNSON
Attesting Officer

DAVID L. LADD
Commissioner of Patents